UNITED STATES PATENT OFFICE 2,262,138

METHOD FOR THE CONTROL OF PROTEOLYTIC ACTIVITY

Charles N. Frey, Scarsdale, Jacob Freilich, New York, and Herbert C. Gore, Scarsdale, N. Y., assignors to Standard Brands Incorporated, New York, N. Y., a corporation of Delaware No Drawing. Application November 7, 1936, Serial No. 109,750

5 Claims. (Cl. 99—90)

The invention relates to a method for the regulation or control of the activity of proteolytic enzymes, and more particularly it relates to a procedure in connection with the manufacture of baked goods in which a control of the proteolytic enzyme activity is accomplished, and includes correlated improvements and discoveries whereby the quality of such goods is enhanced.

It is an object of the invention to provide a procedure in accordance with which the activity of proteolytic enzymes may be controlled, that is, either augmented or decreased through a regulation of the oxygen content of the environment in which the enzyme is acting.

A further object of the invention is the provision of a method in which the activity of proteolytic enzymes is controlled through a regulation of the amount of oxygen in contact with the enzyme or substrate, or enzyme-substrate complex, especially through the utilization of a compound containing loosely combined oxygen.

Another object of the invention is to provide a method which will enable bakers to produce goods of improved qualities and having uniform loaf volume, texture and crumb.

An additional object of the invention is to provide a procedure whereby the loaf volume of baked goods may be regulated, and in so doing "buckiness" of the dough is decreased and even entirely obviated.

Other objects of the invention include the provision of a method whereby the proteolytic activity or effect in a dough may be increased or decreased by regulating the amount of oxygen present; slight modification of the present practice will enable the baker to manufacture his products more readily, economically and efficiently than heretofore due to uniformity of the goods produced, and which will permit the use of weak flours by a baker with the production of goods having substantially the qualities possessed by those made from strong flours.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention the activity of proteolytic enzymes, for example those present in malt products, flours, and arising from the growth of various molds, as the Aspergillus and Penicillium, may be controlled through placement in a medium or an environment with respect to which the oxygen content is regulated. Regulation of the oxygen content of the environment may be accomplished by removal of the air and/or oxygen therefrom through evacuation to the desired extent, followed by introduction of an oxygen containing gas in an amount sufficient to give the effect desired upon the activity of the proteolytic enzymes. Thus a mixture of materials, as ingredients entering into a dough batch, may be placed in a container and the air removed by means of a vacuum pump. A dough may then be formed from the ingredients by admixture in an atmosphere having a regulated content of oxygen. The oxygen admitted to the atmosphere may be air, or air enriched in oxygen, or oxygen per se. A pressure greater than atmospheric may be utilized as a regulatory factor.

We have found that the effect of the oxygen is enhanced by the presence of an oxygen carrier, for example, ascorbic acid. Further, the oxygen content of the enzyme environment may be regulated by the presence therein of a compound containing loosely combined oxygen. Such a compound may be utilized alone or in conjunction with an oxygen carrier, or in addition to an oxygen containing gas and an oxygen carrier. As compounds containing loosely combined oxygen, mention may be made of innocuous halogen oxidizing compounds as chlorates, perchlorates, bromates, perbromates, iodates, periodates, and other including persulfates, percarbonates, perphosphates, peracetates, the peroxides of calcium, magnesium and hydrogen and the like. Furthermore, these compounds may be and preferably are in the form of sodium, potassium and ammonium salts. When utilized in connection with the manufacture of baked goods, the usual ingredients entering thereinto may be admixed and have incorporated therewith material containing proteolytic enzymes and a compound containing loosely combined oxygen. The release of oxygen may be facilitated by the presence of a catalytic agent, for example, a water soluble vanadium compound, as sodium ortho and metavanadate, vanadyl sulfate, divanadyl chloride, and the like.

When a dough is formed from such an admixture, handled and baked in the usual manner, it will be found that the action of the proteolytic enzymes has been definitely controlled with an obviation of the tendency of the dough to become so soft that it cannot be handled. The extent to which the regulation of the oxygen content is carried will depend upon the effect sought, that is, if the proteolytic effect is to be in a very large measure eliminated, a relatively large proportion of oxygen will be permitted in the environment. On the other hand if the proteolytic effect is to be marked, then the oxygen content of the environment or medium will be relatively low. It is possible thereby to obtain that degree of control of the activity of proteolytic enzymes which will permit the preparation of products having a given proteolytic effect and the determination and estimation of the proteolytic enzyme activity of materials known to contain the enzymes or suspected to have such a content. This result may be due to an action upon the substrate, or an enzyme-substrate complex.

As illustrative of a manner in which proteolytic enzyme activity may be controlled by a regulation of the oxygen content of the environment, the following descriptions are presented. A bread was prepared by admixing usual ingredients, i. e., flour, water, yeast, sugar, salt and, if desired, auxiliary dough ingredients, and to a part of such ingredients was added papain as a proteolytic enzyme containing material and potassium bromate in such an amount that the ingredients entering into the production of the usual pound loaf contained about 50 milligrams papain and about 10 milligrams potassium bromate. The ingredient mixture was formed into dough in the usual manner and, after proofing, shaped into loaves and baked. The check, that is, containing no added papain or bromate, had a loaf volume of 2050 c. c. The loaf containing 50 milligrams papain had a loaf volume of 1800 c. c., and that containing 50 milligrams papain and 10 milligrams bromate 2080 c. c. It is apparent therefrom that the loaf containing 50 milligrams of papain had much less volume than that which was free from papain, and the papain loaf showed the usual characteristics attending very strong proteolytic activity, such as sharp corners, very smooth sides, flat top, and a broken down interior structure. These characteristics are all due to the softness and fluidity of the dough occasioned by the action of the papain on the gluten during the period between the mixing of the dough and the placing thereof in the oven.

The loaf containing papain and bromate had a slightly greater volume than that of the check, and was similar in all other respects thereto, thus evidencing that the bromate had offset the effects produced by the papain alone due to its readily releasable oxygen content. The effect of a compound containing loosely combined oxygen upon proteolytic enzymes is shown in the following tabulation:

|  | Condition of dough in molding | Loaf volume |
|---|---|---|
| Check | Normal | 2030 |
| Papain—75 mg | Nearly liquid | 1370 |
| Papain—75 mg—bromate, 10 mg. | Extremely soft | 1380 |
| Papain—75 mg—bromate, 20 mg. | Better than 10 mg. dough, but too soft to handle. | 1520 |
| Papain—75 mg—bromate, 30 mg. | Almost tight enough to handle. | 1840 |
| Papain—75 mg—bromate, 40 mg. | Very soft, just possible to handle. | 1920 |
| Papain—75 mg—bromate, 50 mg. | Soft | 2020 |
| Papain—75 mg—bromate, 60 mg. | Soft | 2000 |
| Papain—75 mg—bromate, 70 mg. | Slightly soft | 1990 |
| Papain—75 mg—bromate, 80 mg. | Nearly normal | 1990 |

It will be observed that the loaf containing 75 milligrams of papain without an oxygen releasing compound exhibited maximum proteolytic effect, and it possessed the characteristics above described in connection with the 50 milligram loaf, but to a decidedly greater extent. As the quantity of bromate was increased the proteolytic activity of the papain was decreased or inactivated in proportion, as is evidenced by the increasing tightness of the dough, the increase in loaf volume, and the improved bread characteristics. This is shown as taking place progressively and was completely obviated by the inclusion of 80 milligrams of bromate.

The influence of an oxygen carrier is shown by the inclusion of ascorbic acid in conjunction with papain in the manufacture of bread. A check loaf had a volume of 2130 c. c., whereas a loaf made from ingredients containing 50 milligrams of papain had a volume of 1900 c. c., and one containing 50 milligrams papain and 20 milligrams ascorbic acid a volume of 2030 c. c. That loaf which contained merely 50 milligrams of papain possessed characteristics of a strong proteolytic action, but the loaf containing ascorbic acid as well as papain was similar to the check loaf, thus showing that an oxygen carrier, as ascorbic acid, effects a material regulation upon the activity of the proteolytic enzymes.

The ascorbic acid has a limited affect upon the proteolytic activity, and when the amount is sufficient to produce this result an excess of the acid is of no avail. We have demonstrated that when using 75 milligrams of papain in the dough mix per loaf the influence of the ascorbic acid is fully exerted by the presence of 30 milligrams. It is believed, therefore, that the action of the ascorbic acid is an intermediate one, and that it serves as a carrier whereby oxygen is transferred from the enzyme environment to the enzyme, or substrate or enzyme-substrate complex. Hence its effect will be governed by the quantity of oxygen available in the environment.

The effect of the oxygen in the atmosphere in contact with proteolytic enzymes, whereby they are inactivated, or whereby the substrate is made less susceptible to the enzymic action, may be shown, also, in the following manners: two doughs may be mixed containing the same ingredients in the same proportions, with the mixing of the one being effected in air and the other in an atmosphere of carbon dioxide. The carbon dioxide removes the atmospheric oxygen to a considerable extent during the mixing. Each dough contained 50 milligrams of papain. The dough mixed in air, after baking, had a loaf volume of 1820 c. c. whereas that mixed in carbon dioxide had a volume of only 1480 c. c. The loaf made from the dough mixed in carbon dioxide showed very strong proteolytic effect, while that mixed in air was substantially normal. The effect of the oxygen content of the atmosphere is thus shown. The result is that the proteolytic enzyme activity is controlled or decreased and the enzyme may be entirely inactivated but not destroyed.

Doughs similar to the above were prepared, and in the mixing one was effected in air and the other in nitrogen. That mixed in air gave a loaf volume of 1900 c. c., whereas that in nitrogen was 1670 c. c. These results show again the marked effect of the oxygen content of the atmosphere in which mixing is effected upon the baked product. Further, a dough was prepared containing 50 milligrams papain per loaf, and the dough formed, or the ingredients mixed in an atmosphere having an oxygen content greater than that present in air. This was brought about by admitting pure oxygen into the mixing chamber. The loaves baked from the doughs so produced are like unto those mixed in the presence of air, but they show distinctly that the oxygen content of the mixing atmosphere controls the activity of the proteolytic enzymes.

Moreover, if more oxygen is made available in the mixing atmosphere the enzyme activity may be entirely prevented.

Thus the atmosphere may be air, or the air may be removed to a desired extent through evacuation, and that removed replaced in a suitable amount by the admission of pure oxygen. The air, furthermore, may be entirely removed, and a percentage of oxygen introduced to effect a given amount of inactivation of the proteolytic enzymes. By introducing pure oxygen into the mixing chamber containing air, as above described, it is possible to regulate the oxygen content so that the proteolytic enzyme activity may be decreased to give a baked product of prescribed qualities.

The inhibition of proteolytic enzyme activity was also demonstrated by placing small pieces of washed gluten into water and adding to certain of the suspensions so obtained papain and pepsin as proteolytic enzyme materials. Some of the solutions so treated were evacuated and sealed and then placed in a shaking apparatus. Through others of the gluten suspensions oxygen and air were bubbled and these suspensions contain an amount of papain and pepsin equal to that in the solutions which were evacuated. After 24 hours the solutions were examined and the gluten in the solutions which had been evacuated was disintegrated to a much greater extent than the gluten in the flask through which oxygen and air had been bubbled. This demonstrates that the presence of oxygen in the solutions retarded the action of papain and pepsin on the suspended gluten. It indicates also that the proteolytic enzyme is an anaerob.

By the foregoing procedures it is possible so to regulate or control the proteolytic enzyme activity of a substance or mix that the action may proceed to the extent that may be desired. This is of particular import in the production of baked goods, and renders it possible to provide for a mixing of the ingredients so that the air and oxygen may be removed and then alowed to enter into the mixing chamber forming an atmosphere containing such amounts of oxygen as are required for the preparation of baked goods of improved qualities from a particular flour or mixture of flours. The control of proteolytic enzyme activity by regulation of oxygen content of the environment also leads to a control of "buckiness" in the dough, the loaf volume, and the texture and crumb of the product.

The foregoing method of control places at the disposal of those concerned a procedure whereby products evidencing any desired kind of proteolytic enzyme effect may be produced, and whereby estimation of proteolytic enzymes in a material, as a flour, may be accurately determined and is distinctly simplified. It is shown further that different flours will require different conditions under which they shall be formed into a dough, depending upon their proteolytic enzyme content. This may be effected by constructing the mixers so that they will be substantially airtight, which will permit evacuation followed by admission of predetermined and regulated amounts of oxygen with respect to any desired dough. In addition the amount and character of bread improving compositions would be modified according to the different types of flour, and the use of a weak flour, i. e., a flour wherein weakness is due to high proteolytic activity, for the production of products having the characteristics of a strong flour, is made available to the baker.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for the manufacture of baked products which comprises admixing dough ingredients in substantial absence of oxygen, and controlling proteolytic enzyme activity by forming a dough in an atmosphere having a regulated amount of oxygen said amount being directly proportional to proteolytic enzyme content of the dough whereby a desired proteolytic effect is obtained.

2. A method for the manufacture of baked products which comprises admixing dough ingredients in substantial absence of oxygen, and controlling proteolytic enzyme activity by forming the dough in the presence of a regulated amount of oxygen in the form of a compound containing loosely combined oxygen, said amount being directly proportional to proteolytic enzyme content of the dough whereby a desired proteolytic effect is obtained.

3. A method for the manufacture of baked products which comprises incorporating a proteolytic enzymic material with the ingredients of a dough batch, and controlling proteolytic enzyme activity by forming a dough therefrom under the influence of an oxygen containing gas in a regulated amount and in the presence of an ascorbic acid, the amount of oxygen containing gas being in direct proportion to the proteolytic enzyme content of the dough whereby a desired proteolytic effect is obtained.

4. A method for the manufacture of baked goods which comprises admixing dough ingredients, removing oxygen, and controlling proteolytic enzyme activity by forming a dough therefrom to which oxygen in regulated amounts is added, said amounts being in direct proportion to proteolytic enzyme content of the dough whereby a desired proteolytic effect is obtained.

5. A method for the manufacture of baked products which comprises admixing dough ingredients in substantial absence of oxygen and controlling proteolytic enzyme activity by forming a dough in an atmosphere having a regulated amount of oxygen and in the presence of an ascorbic acid, said amount of oxygen being proportioned relative to proteolytic enzyme content of the dough so as to yield a pound loaf having a volume of 1900 to 2080 cc.

CHARLES N. FREY.
JACOB FREILICH.
HERBERT C. GORE.